US010749985B2

(12) United States Patent
Kapila

(10) Patent No.: US 10,749,985 B2
(45) Date of Patent: Aug. 18, 2020

(54) CUSTOM COMMUNICATION CHANNELS FOR APPLICATION DEPLOYMENT

(71) Applicant: Amazon Technologies, Inc., Seattle, WA (US)

(72) Inventor: Dhanvi Harsha Kapila, Redmond, VA (US)

(73) Assignee: Amazon Technologies, Inc., Seattle, WA (US)

( * ) Notice: Subject to any disclaimer, the term of this patent is extended or adjusted under 35 U.S.C. 154(b) by 551 days.

(21) Appl. No.: 14/716,700

(22) Filed: May 19, 2015

(65) Prior Publication Data

US 2016/0344798 A1 Nov. 24, 2016

(51) Int. Cl.
*H04L 29/08* (2006.01)
*G06F 8/60* (2018.01)
*H04L 29/06* (2006.01)

(52) U.S. Cl.
CPC ............... *H04L 67/34* (2013.01); *G06F 8/60* (2013.01); *H04L 63/08* (2013.01); *H04L 63/101* (2013.01); *H04L 67/10* (2013.01); *H04L 67/141* (2013.01); *H04L 63/0869* (2013.01)

(58) Field of Classification Search
CPC ....... H04L 63/101; H04L 63/10; H04L 63/08; H04L 67/141; H04L 67/34; G06F 8/60
See application file for complete search history.

(56) References Cited

U.S. PATENT DOCUMENTS

| | | | |
|---|---|---|---|
| 6,754,709 B1 * | 6/2004 | Gbadegesin | H04L 29/06 709/227 |
| 7,523,177 B2 | 4/2009 | Brittenham et al. | |
| 7,660,879 B2 | 2/2010 | Srinivasan | |
| 7,735,097 B2 | 6/2010 | Kovachka-Dimitrova et al. | |
| 7,950,010 B2 | 5/2011 | Goger et al. | |
| 8,402,540 B2 | 3/2013 | Kapoor et al. | |
| 8,726,264 B1 | 5/2014 | Allen et al. | |
| 8,984,162 B1 | 3/2015 | Allen et al. | |
| 2002/0120744 A1 * | 8/2002 | Chellis | G06F 9/50 709/226 |
| 2007/0061277 A1 | 3/2007 | Boden et al. | |
| 2007/0233681 A1 * | 10/2007 | Ronen | G06F 8/71 |

(Continued)

FOREIGN PATENT DOCUMENTS

WO 2014090982 6/2014

OTHER PUBLICATIONS

Amazon Web Services, "AWS Elastic Beanstalk API Reference", API Version, Dec. 1, 2010, pp. 1-132.

(Continued)

*Primary Examiner* — Aaron N Strange
(74) *Attorney, Agent, or Firm* — Robert C. Kowert; Kowert, Hood, Munyon, Rankin & Goetzel, P.C.

(57) ABSTRACT

An application deployment service (ADS) component receives a request to establish a communication channel for clients to submit deployment artifacts associated with an application. A set of endpoints are created for the channel. In response to receiving a message via one of the endpoints, the ADS determines that additional security verification operations are to be performed before a deployment task indicated in the message can be performed. After the security verification operations are completed, the task is implemented.

20 Claims, 9 Drawing Sheets

(56) References Cited

U.S. PATENT DOCUMENTS

| | | | |
|---|---|---|---|
| 2008/0096507 A1* | 4/2008 | Erola | H04L 51/38 |
| | | | 455/187.1 |
| 2008/0172446 A1* | 7/2008 | Donovan | H04N 21/25875 |
| | | | 709/202 |
| 2008/0249961 A1* | 10/2008 | Harkness | G06Q 30/0283 |
| | | | 705/400 |
| 2009/0132543 A1* | 5/2009 | Chatley | G06F 3/0613 |
| 2011/0219132 A1* | 9/2011 | O'Reilly | H04L 67/16 |
| | | | 709/229 |
| 2013/0072160 A1* | 3/2013 | Lawson | H04L 63/102 |
| | | | 455/411 |
| 2013/0086212 A1 | 4/2013 | MacInnis | |
| 2014/0173594 A1 | 6/2014 | Ng et al. | |
| 2015/0066919 A1* | 3/2015 | Park | G06F 17/30047 |
| | | | 707/724 |
| 2015/0205600 A1* | 7/2015 | Grillo | G06F 8/70 |
| | | | 717/101 |
| 2015/0242643 A1* | 8/2015 | Hankins, Jr. | H04L 63/04 |
| | | | 726/26 |
| 2016/0196124 A1* | 7/2016 | Vedula | G06F 8/60 |
| | | | 717/177 |

OTHER PUBLICATIONS

Amazon Web Services, "AWS Elastic Beanstalk Developer Guide", API Version, Dec. 1, 2010, pp. 1-788.

Amazon Web Services, "AWS CloudFormation API Reference", API Version, May 15, 2010, pp. 1-65.

Amazon Web Services, "AWS CloudFormation User Guide", API Version, May 15, 2010, pp. 1-655.

Amazon Web Services, "AWS CodeDeplay API Reference", API Version, Oct. 6, 2014, pp. 1-94.

Amazon Web Services, "AWS CodeDeploy User Guide", API Version, Oct. 6, 2014, pp. 1-206.

International Search Report and Written Opinion from PCT/US2016/033319, dated Aug. 24, 2016, Amazon Technologies, Inc., pp. 1-17.

John V., "Managed Filed Transfer and Network Solutions", Posted Jul. 19, 2014, Retrieved from URL: http://www.iscape.com/blog/bid/80512/Active-v-s-Passive-FTP-Simplified, pp. 1-6.

Office Action from Canadian Application No. 2,986,230, dated Aug. 23, 2018, (Amazon Technologies, Inc.), pp. 1-6.

Office action from European Application No. 16728774.7-1213, dated Apr. 4, 2020, pp. 1-6.

* cited by examiner

CUSTOM COMMUNICATION CHANNELS FOR APPLICATION DEPLOYMENT

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

Some large cloud-based provider networks implement a number of network-accessible services, including virtual computing services that can be used to implement a variety of applications. For example, a customer of a virtual computing service may request the allocation of some number of guest virtual machines (also known as compute instances) with specified performance capacities, and configure the guest virtual machines as web servers, application servers, database servers and the like to set up a multi-tier web-based application. A number of additional services of the provider network may be utilized for various components of complex applications, such as database services, storage services and the like.

Some services of a provider network may utilize components of other services to accomplish commonly-used patterns or sequences of tasks. For example, for certain types of applications (such as web-based applications written in popular languages such as Ruby, PHP, or Java™), application deployment workflows can be largely or fully automated using a provider network's deployment service. If a customer of the deployment service provides sufficient configuration metadata and a collection of source or executable files, the deployment service may be able to allocate and configure the appropriate resources of computing, storage and networking services needed to bring the application online. In some cases, the service may also be able to monitor the performance of the application and add or remove resources as needed based on workload changes. From the perspective of the application developers, however, some of the mechanisms that are typically available to communicate with an application deployment service may be somewhat cumbersome. Especially in agile software development organizations with fast code development rates and large numbers of developers, the communication mechanisms of a deployment service may sometimes limit productivity.

Figure 1:
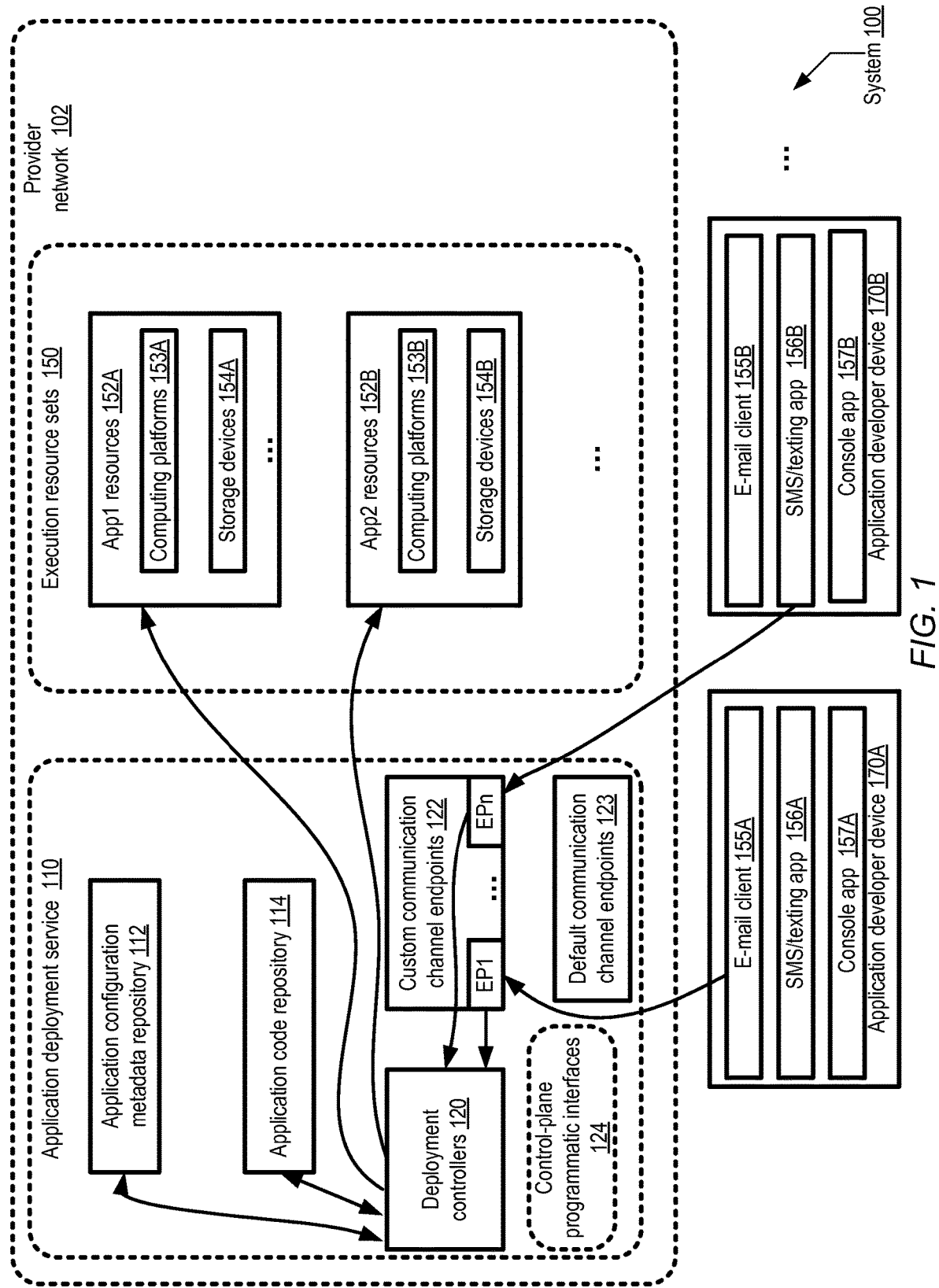
FIG. 1 illustrates an example system environment in which customized communication channels may be established on demand for an application deployment service, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for supporting customized secure communication channels for communications between clients and an application deployment service of a provider network are described. Networks set up by an entity such as a company or a public sector organization to provide one or more services (such as various types of multi-tenant and/or single-tenant cloud-based computing or storage services) accessible via the Internet and/or other networks to a distributed set of clients or customers may be termed provider networks in this document. Provider networks may also be referred to as "public cloud" environments. At least some of the services of a provider network (and hence, some of the resources used for application development and deployment) may rely on virtualization in some embodiments—e.g., virtual machines may be used as the units of computing assigned to clients of a computing service, and virtualized storage devices may be provided to clients of a storage service. Some services of a provider network may be built using components of other services—e.g., a database service may use virtual machines of a virtual computing service as the underlying processing engines, and store database contents at storage devices of one or more storage-related services.

According to at least some embodiments, a provider network may include an application deployment service (ADS) intended to simplify and automate a number of different categories of deployment tasks of certain types of applications. Clients of the ADS may, for example, upload an executable version of a given application according to specified rules, and the ADS may then handle the details of capacity provisioning, load balancing, scaling, application health monitoring and the like, without the clients having to be concerned with the details of the resources being used. In some embodiments, the ADS may use a number of other services of the provider network, including for example a virtual computing service, one or more storage services, one or more database services, a notification service, a health monitoring service, a load balancing service, an auto-scaling service, and one or more data caching services. In at least some embodiments, the ADS may implement or support one or more programmatic interfaces, such as a web-based console, as the default mechanisms by which application developers or managers can upload pre-packaged applications (e.g., in the form of .jar files or .war files for Java™-based applications) for deployment.

In various embodiments, the ADS may also support the creation of custom (e.g., application-specific or customer-specific) secure communication channels such as e-mail channels or messaging application channels enabling selected groups of developers or application administrators to submit deployment artifacts to the ADS. Depending on the requested properties for a given custom channel, the channel may be used for transmitting one or more categories of deployment artifacts, such as individual source code files, compiled executable files, interpretable script files, packaged versions of applications, or configuration files. In at least some embodiments, the ADS may provide a programmatic interface enabling clients to submit requests for creating customized communication channels. The requests, which may for example be submitted by authorized parties such as managers or administrators of a software development team, may indicate the type of communication requested (e.g., e-mail, one or more variants of FTP (File Transfer Protocol) or similar data transfer applications, SMS (Short Message Service) or other messaging applications), the set of client-side entities or devices to be permitted to use the channels, security details, and various other characteristics of the channels as described below in further detail.

In response to receiving a request to set up a custom channel for an application, a component of the ADS may first verify that the request is from an authorized party and should be fulfilled, e.g., by looking up the requester's records in a customer database. If the request is acceptable, the ADS may communicate internally within the provider network with one or more other services, such as an e-mail service, a messaging service or a file transfer service, and/or with external communication services, to set up a set of communication endpoints for the requested channel. In one embodiment in which e-mail communication is requested, for example, a set of e-mail addresses may be established as endpoints specifically for the application, while in a scenario in which SMS is the preferred communication mechanism, a set of SMS destination numbers may be created as endpoints. A list of the endpoints may be provided to the requester of the custom channel, e.g., for distribution among a group of software developers or other clients who are to be permitted to use the endpoints. In some embodiments, either the ADS or the requester may partition the set of endpoints into sub-groups, e.g., with one sub-group to be used for source code file submission, another sub-group for configuration change submissions, and a third sub-group for executable file submissions. In at least one implementation, different endpoints may have respective sets of additional security verification requirements set up—e.g., to ensure that the artifacts were transmitted by authorized submitters, a multi-step and/or multi-party authentication protocol may be used, or some other proof of the submitter's identity may be required. In a multi-step authentication protocol, the ADS may not implement any changes to the application deployment based on a particular set of received artifacts until one or more additional verification messages are received (e.g., from the submitter in response to a challenge from the ADS). In a multi-step multi-party authentication protocol, a confirmation that the sender of the artifacts is authorized to submit at least the type of message received using the custom channel may have to be obtained at the ADS from some other trusted party, e.g., in response to a verification query sent by the ADS. In some embodiments, respective "white lists" of pre-approved sender endpoints (and/or recipient endpoints) may be maintained by the ADS, and verifying that a given message containing a deployment artifact is received from one of the white-listed sender endpoints may be sufficient for security verification. In one embodiment, a white-list of trusted third parties may also or instead be maintained at the ADS (or stored elsewhere and accessed from the ADS) for multi-party authentication purposes.

After the endpoint information has been propagated to the developers and/or other clients of the ADS, the clients may begin submitting their artifacts. When a message is received at one of the custom channel endpoints set up for a given application, a component of the ADS may parse the contents of the message and extract a deployment-related payload. Depending on the nature of the artifacts included in the payload, and/or on the security rules set up earlier for the channel or the endpoint, the ADS may first have to perform one or more additional security verification operations. If any such additional verifications are required, and the corresponding operations are successfully completed, the ADS may implement one or more deployment tasks using the artifacts. For example, if the artifact is an executable package, the package may be transmitted to the appropriate set of execution platforms and deployed according to the rules of the programming environment being used—for example, an application server process or a web server process may be restarted in some cases. If the artifact is a source code file or a set of source code files, in some embodiment the ADS may determine exactly where in the source code hierarchy of the application the source code is to be placed, compile a new version of the application using the received source code, and deploy the new version of the application. If the artifact includes configuration changes, in some embodiments the ADS may determine how the changes are to be applied and then apply the changes if the requested changes are deemed feasible—e.g., by replacing one configuration file with another, by acquiring additional resources as part of the deployment target fleet of the application, by removing one or more resources from the fleet, or by some other means. The ADS may thus respond to different submissions by performing different sets of actions. In at least some embodiments the ADS may ensure, before modifying the state of an application, that a snapshot of a fully functional state of the application (e.g., the source and/or executable files) is stored in a repository. The saved state may be restored by the ADS if the newly submitted changes are not successful.

As mentioned earlier, different sets of clients of the ADS (e.g., software developers working on various parts of the application code, application configuration experts, and the like) may be granted permissions to use respective sets of custom channel endpoints in some embodiments, with respective security-related rules being enforced. By setting up easy-to-use mechanisms such as e-mail or SMS, it may become considerably easier for the clients to submit changes to applications than if all the clients had to use the ADS's default set of interfaces. As a result, at least in some cases, the software development process may be speeded up for the corresponding applications. In various embodiments, the custom channels may be terminated or closed during certain phases of the development process for certain clients—e.g., the ADS may support opt-out interfaces which can be used to disable custom channels or subsets of channel endpoints as needed. In some embodiments, each endpoint created may have an associated expiration time, after which the endpoint may no longer be used unless it is renewed. Various other aspects of the manner in which custom communication channels may be set up and used at application deployment services are described below in further detail.

Example System Environment

FIG. 1 illustrates an example system environment in which customized communication channels may be established on demand for an application deployment service, according to at least some embodiments. As shown, system 100 includes a provider network 102 at which an application deployment service (ADS) 110 is implemented. The ADS 110 may enable clients to simplify the process of deploying and managing various applications. For example, using either a default communication channel or custom communication channels supported by the ADS 110, a client may provide application contents and configuration settings, and the ADS may then take over the responsibility of acquiring, configuring and managing the status of the resources necessary for the application. In the depicted embodiment, deployment controller components 120 of the ADS 110 have deployed one application ("App1") to a first set of resources 152A, and a second application ("App2") to a second set of resources 152B. Each resource set 152 comprises a set of computing platforms 153 (e.g., computing platforms 153A and 153B for App1 and App2 respectively) and a set of storage platforms 154 (e.g., 154A and 154B for App1 and App2 respectively) in the depicted example. The resource sets 152 used for different applications may overlap in some embodiments due to the multi-tenant nature of the provider network's services.

As shown, the ADS 110 comprises an application configuration metadata repository 112 and an application source repository 114. Application configuration metadata repository 112 may comprise respective records for each managed application (such as App1 and App2) indicating the kinds of resources required for the application, the manner in which the resources are to be interconnected, the roles (e.g., "web server" versus "application server" versus "database server") played by the resources in the application, rules to be used to add or remove resources from the application's resource set, and so on. Application source repository 114 may include one or more hierarchies of source code (and/or corresponding executable code modules) for each managed application in the depicted embodiment. In at least some embodiments, the source code and/or configuration metadata may be physically stored at one or more storage services of the provider network, and the ADS may comprise pointers to the locations at which the source code and configuration metadata is located.

The ADS may implement one or more control-plane or administrative programmatic interfaces 124 in the depicted embodiment, enabling authorized clients to submit various types of requests including requests to set up custom communication channels to be used to submit deployment-related artifacts such as source or executable files, entire executable programs, and/or various types of configuration settings. In response to a request to set up a custom communication channel received via an interface 124, the ADS may initiate the establishment of one or more custom communication channel endpoints 122, such as EP1-EPn. For example, EP1-EPn may comprise respective email addresses, SMS/texting destination addresses, IP (Internet Protocol) addresses and ports to be used for FTP-like transfers, or combinations of such different types of endpoints. The details of the EPs may have been provided by the ADS to the requesting parties, for further propagation to application developers and/or other types of clients. In the depicted embodiment, for example, EP1 has been set up for App1 developers, while EPn has been set up for App2 developers (e.g., in response to respective channel setup requests received from App1 and App2 administrators or owners). In some embodiments, a given application may have a variety of different custom channel endpoints set up for it—e.g., some number of email addresses, some number of texting destinations, and so on. The custom channel endpoints may be created at the request of the ADS by one or more other entities in some embodiments, such as an email service component, a messaging service component, and the like. In the absence of or in addition to custom channels, clients of the ADS may use default communication channel endpoints 123 (such as endpoints or addresses for web-based administration consoles, application programming interfaces, custom GUI interfaces, command line tools, and the like) to submit various types of deployment-related artifacts. In at least one embodiment, the custom channel creation requests may also be submitted via the default communication channel endpoints 123.

After the custom channel endpoints requested for a given application such as App1 or App2 have been set up, messages containing various types of deployment artifacts for the application may be submitted to the endpoints, e.g., from application developer devices 170 such as 170A or 170B. A variety of computing devices may be used as application developer devices 170 in different embodiments, including for example servers, workstations such as desktop personal computers, laptops, tablets, smart phones and the like. In the depicted embodiment, each developer device 170 is shown as comprising a respective e-mail client 155 (e.g., 155A and 155B), a respective SMS/texting application client 156 (e.g., 156A and 156B), and a respective console application (e.g., a web browser) 157 usable for the default communication channel of the ADS. The e-mail client 155A of device 170A may be used to submit deployment artifacts of App1 to EP1, while the SMS/texting application 156B may be used to submit deployment artifacts of App2 to EPn. In some implementations, some or all of the client-side components such as e-mail clients, SMS/texting applications and the like may be implemented as plug-ins or add-ons to integrated development environments (IDEs) and/or other software development tools.

When a particular message from a device 170 is received at an endpoint 122, it may be parsed (e.g., by or on behalf of a deployment controller 120) to extract the contained deployment artifacts. The contents of the messages received at the endpoints may be referred to herein as "payloads". The kind of deployment artifacts included in the message may indicate, or be used to deduce, the deployment actions or tasks to be initiated in some embodiments. For example, if a .war or .jar file compatible with a version of Java™ is included in the message, a deployment controller 120 may infer that the file is to be copied to one or more destination resources of a resource set 150 for deployment (e.g., App1's resource set 152A or App2's resource set 152B), and if a configuration file is included in the message, the deployment controller may save the configuration settings in repository 112 and then apply the configuration settings. In some cases, depending on the kind of application execution environment in use for App1 and/or App2, a given submission via EP1 or EPn may result in changes at the code repository 114 and at the execution resource sets 152. In at least some embodiments, depending on various factors such as the security settings of the application, the communication channel or the endpoint used, additional security verification steps may be performed or initiated by the deployment controller 120 before any changes are made. The verification steps may for example include a multi-step authentication procedure, in which a second message is sent back to the submitter, and a timely response to the second message is used to authenticate the sender's identity. In another approach, a multi-party verification mechanism may be used, in which for at least some types of submissions received via the custom channel endpoints, an approval request for the submitted change may be sent to a different party than the sender (e.g., a "peer" developer or a trusted authority), and the requested change may not be accepted until it is approved. If such verification steps fail, the message containing the corresponding artifacts may be discarded in various embodiments, e.g., either silently or after an indication of an error is provided to the sender.

Overview of Custom Channel Setup

Figure 2:
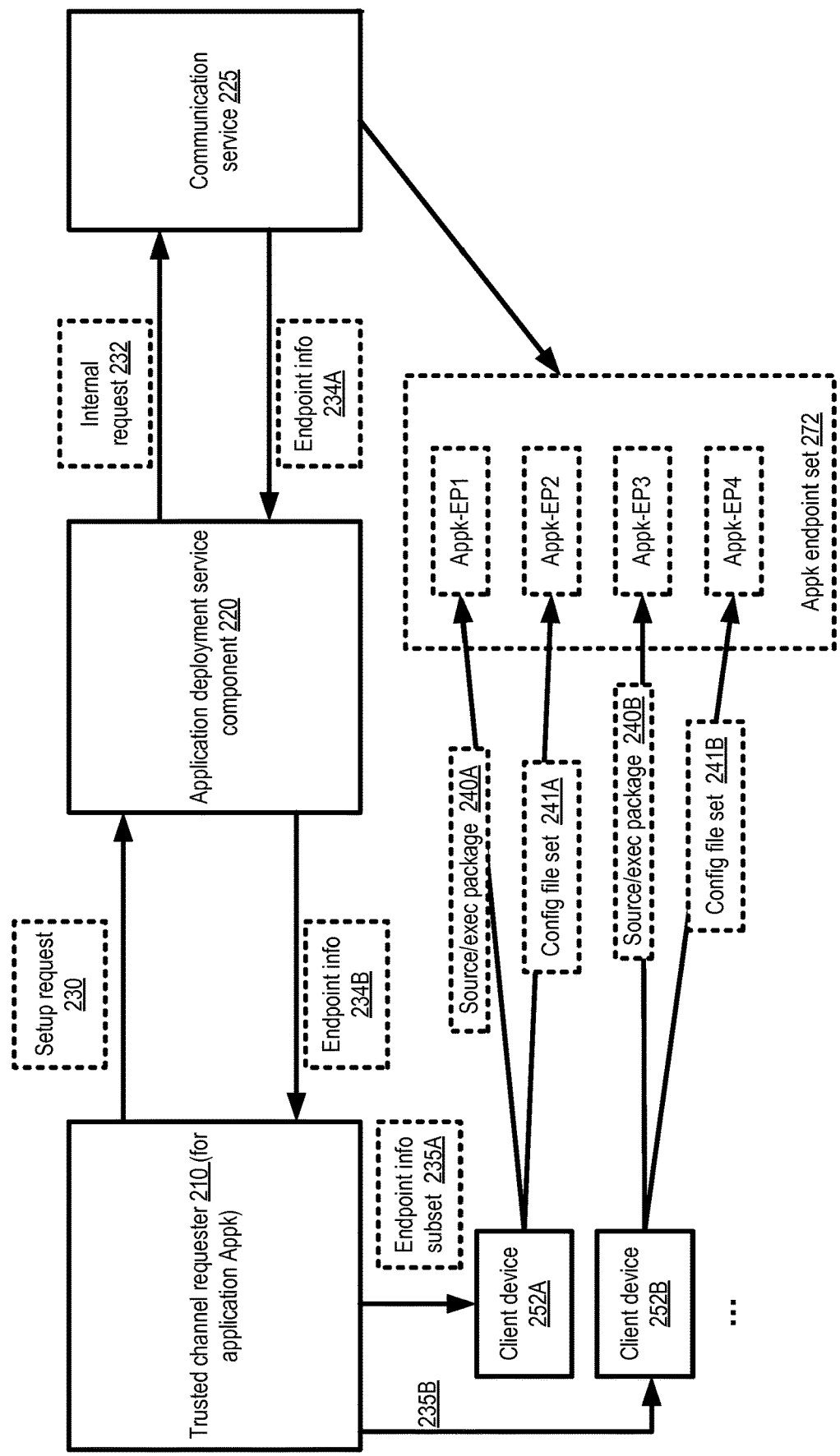
FIG. 2 illustrates example interactions between clients and control plane components of an application deployment service, according to at least some embodiments.

FIG. 2 illustrates example interactions between clients and control plane components of an application deployment service, according to at least some embodiments. A shown, a trusted channel requester 210 for a particular managed application "Appk" may transmit a setup request 230 for a custom communication channel to a control-plane component 220 of the application deployment service (ADS). The trusted requester may, for example, have a user identifier to which administrative privileges with respect to Appk deployments have been granted by the ADS. The setup request may indicate the kind of communication channel required (e.g., e-mail versus SMS) and various desired properties of the channel, such as the number of distinct endpoints needed and/or the additional security verification steps required (if any) for communications received at the ADS via the custom channel. A number of different programmatic interfaces may be supported for the setup request 230 and/or other types of administrative requests associated with the ADS in various embodiments, such as one or more web-based consoles, application programming interfaces (APIs), command line tools, standalone graphical user interfaces and the like.

After authenticating the setup request, verifying that the request is from an authorized and trusted party, the ADS component 220 may send an internal request 232 to a component of a communication service 225 of the provider network in the depicted embodiment, indicating that the custom channel with a designated set of properties is to be created on behalf of the requester 210. The communication service 225 may perform the necessary operations to establish a set of endpoints 272 (Appk-EP1, Appk-EP2, Appk-EP3, Appk-EP4, etc.), to be used for the custom communication channel for Appk—e.g., a new set of e-mail addresses or SMS destination addresses may be created, a set of addresses from a pre-allocated pool of addresses may be selected for endpoint set 272, computing and/or networking resources to handle the messages expected via the new channel may be allocated, and so on. The communication service 225 may send a response 234A indicating the endpoint set 272 to the ADS component 220 in the depicted embodiment. In some embodiments, the ADS component may have to send requests for configuration of the custom channels to entities such as third party communication services outside the provider network, e.g., instead of or in addition to sending the internal request 232 to communication service 225 of the provider network. For example, in one embodiment a telecommunications service provider and/or an external DNS server may be contacted to help with the configuration of the custom channel.

A response 234B which indicates information regarding the endpoint set 272 may then be passed on to the trusted channel requester 210 in the depicted embodiment. Respective subsets of the endpoint information may be provided to various developers or other clients involved in the preparation or testing of Appk, e.g., via messages 235A and 235B sent to client devices 252A and 252B respectively. In some embodiments, for example, the set of endpoints 272 may be partitioned based on the roles of the corresponding clients— some developers may be granted access to one subset of endpoints, while other developers may be granted access to a different subset. In various embodiments, some endpoints may be designated specifically for source code or executable code, while others may be designated for configuration change requests. In the depicted example, source code or executable packages 240A originating at client device 252A may be directed to Appk-EP1, while source code or executable packages 240B originating at client device 252B may be directed to Appk-EP3. Configuration file sets 241A and 241B indicating respective configuration changes for Appk deployments may be transmitted to Appk-EP2 (from client device 252A) and Appk-EP4 (from client device 252B).

In each case, after a message is received from a client device at an endpoint of set 272, the ADS may determine whether additional steps of security verification such as those described earlier are to be applied before the deployment artifacts included in the message are applied or used in corresponding tasks or workflows. In some cases, depending on the requested configuration of the communication channel, no additional security checks may be required. In at least one embodiment, a request to set up a custom communication channel may be sent from a client device 252, instead of being sent from a separate trusted channel requester. In one embodiment, the request for custom channels may be included in the initial configuration messages sent to the ADS regarding the deployment of Appk, in which case separate setup requests may not be required later. In some embodiments, endpoints may be shared among different applications—e.g., if a given customer of the ADS has two separate applications Appk and Appj being managed by the ADS, a single e-mail address may be set up for both Appj and Appk.

In at least some embodiments, authorized parties such as the trusted channel requester may also request the disabling or removal of one or more custom channels using programmatic interfaces similar to those used for the setup request 230. The interfaces may also be used revoke the rights of one or more client entities to use a custom channel or to use a specific set of endpoints of a custom channel. For example, after a particular application has been deployed in a production environment, the rights of various developers and testers to submit deployment artifacts via one or more custom channels set up earlier may be curtailed. If a message is received at one of the endpoints after the submission rights of a client have been revoked, the ADS may discard the message and/or generate an error message in some embodiments. Of course, after the endpoint or the channel as a whole is disabled, an attempt to submit a message may not succeed.

Custom Channel Metadata

Figure 3:
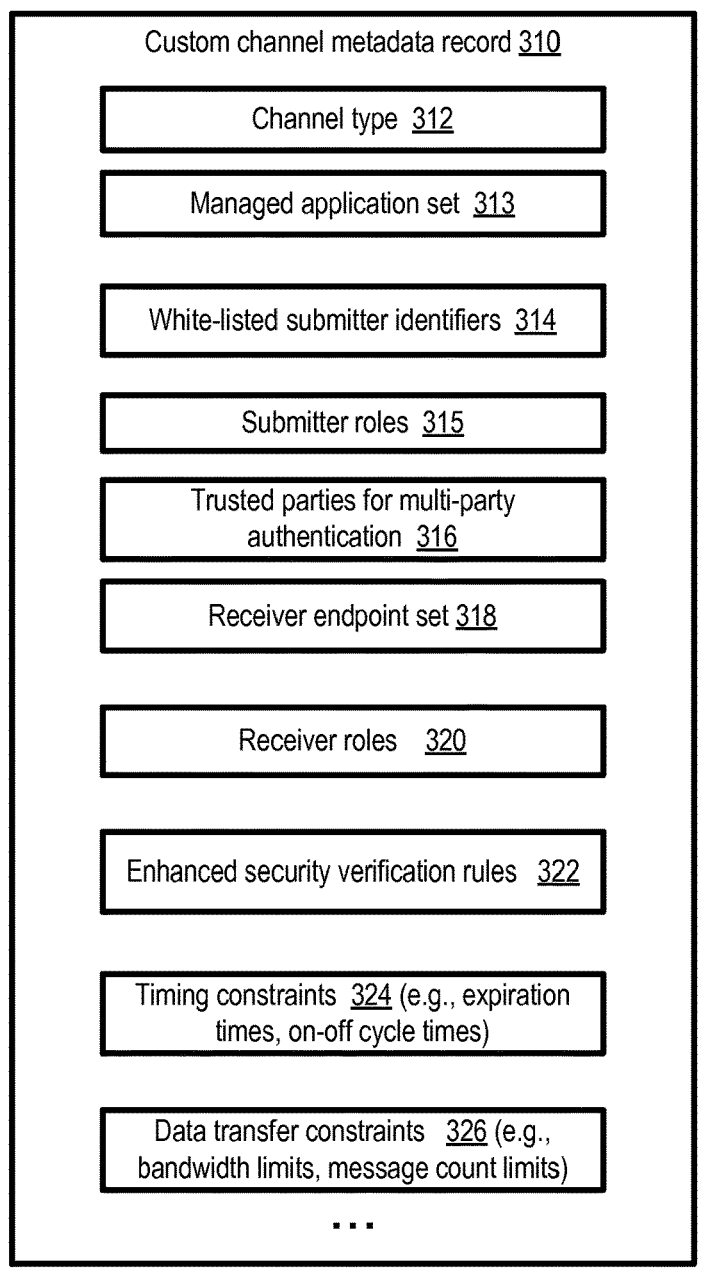
FIG. 3 illustrates example metadata elements that may be stored for custom communication channels of an application deployment service, according to at least some embodiments.

FIG. 3 illustrates example metadata elements that may be stored for custom communication channels of an application deployment service, according to at least some embodiments. As shown, a metadata record 310 for a custom communication channel set up on behalf of one or more customers of an application deployment service may include, among other elements, some combination of a channel type element 312, a managed application set indicator 313, a white-listed submitter identifiers element 314, a list of trusted parties for multi-party authentication 315, a submitter roles element 316, a receiver endpoint set 318, a receiver roles element 320, a set of enhanced security verification rules 322, a set of timing constraints 324, and/or a data transfer constraints element 326 in various embodiments. The channel type 312 may indicate the particular communication mechanism to be used for the channel, such as e-mail, texting/SMS, FTP, and the like. The managed application set 313 may indicate the set of applications for which the channel is to be used. As mentioned earlier, in some cases multiple applications whose deployment is managed by the ADS may be assigned a shared custom communication channel, while in other embodiments a given custom communication channel may be used for no more than one managed application.

A white-list 314 of approved submitter identifiers (e.g., e-mail addresses, IP addresses from which e-mails or file transfers are acceptable, texting source addresses, or the like) may be included in the metadata stored for the custom communication channel in some embodiments. Such a white-list may be used to perform at least a first security validation in some embodiments—e.g., if a source code file is received from a source that is not in the white-list, the submission of that source code file may be rejected by the ADS. In some embodiments, respective submitter roles 316—corresponding to the white-list may also be included in the channel metadata record 310—indicating, for example, the kinds of submissions acceptable from each white-listed submitter. Some submitters may be allowed to change the managed applications' configuration settings, for example, while others may not, and the role information may limit the kinds of deployment-related submissions permissible by the various submitters. In one embodiment, a list of trusted parties 316 to be queried for multi-party authentication purposes may also be included.

In various embodiments, the metadata record 310 may also include the set of receiver endpoints 318 established for the custom channel, and the particular roles (if any) 320 associated with respective receiver endpoints. For example, in one embodiment, one e-mail address may be established as an endpoint to receive source code files from developers of the managed application(s), while a second e-mail address may be established to receive configuration changes. In embodiments in which respective roles are assigned to the receiver endpoints, the roles may be used to verify that deployment artifacts are submitted only to those endpoints designated for them—e.g., a source code file sent to an endpoint designated for configuration change files may be rejected.

Any of a number of enhanced security verification rules 322 may be designated for a custom communication channel. Some rules may be applicable for all messages received via the channel, while others may be applicable only to specific types of messages, a subset of the submitters and/or a subset of the endpoints. In one embodiment, at least for some types of submitted deployment artifacts, a multi-step authentication protocol may be followed. In such a scenario, the ADS may send a first response to a submission, requesting that the sender respond with a security token previously provided by the ADS, or with some additional proof of the sender's identity. In some embodiments, the ADS may make a decision as to whether additional security verification steps are required after parsing and analyzing the contents of a particular message. In accordance with the rules 322, if the message indicates a trivial change (e.g., the addition of comments to a source code file), the ADS may accept the submitted artifact, while for more substantial changes additional security verification operations may be performed. In some embodiments, a given custom communication channel may have one or more timing constraints 324 associated with it—e.g., the channel may have an expiration time after which it is to be shut down, or the channel may only be usable at certain periods during a working day. For example, in one organization, developers may be expected to use a particular communication channel during normal office hours, and a different communication channel after normal office hours. In one embodiment, data transfer constraints 326 may be designated for the custom communication channel, e.g., limiting the bandwidth used for the submissions of deployment artifacts or the number of submissions permitted during a given time period. If a given message violates a data transfer constraint, or contains artifacts whose deployment tasks would result in a violation of data transfer constraints, the message may be rejected in at least some embodiments. In some cases an application deployment service implemented at a provider network may utilize other services of a provider network (e.g., services similar to those illustrated in FIG. 5), or services outside the provider network, to enforce the data transfer constraints 326, timing constraints 324 and/or security rules 322. The contents of at least some of the metadata elements illustrated in FIG. 3 may be derived from the setup requests for the channel—e.g., the number of receiver endpoints established, the white-list of submitters, and/or the security verification rules, etc. may be indicated in the setup request. In various embodiments, one or more of the kinds of metadata elements shown in FIG. 3 may not be used, and in other embodiments additional elements not shown in FIG. 3 may be stored instead or in addition to those shown in FIG. 3.

Examples of Deployment Tasks Performed Using Custom Channels

Figure 4A:
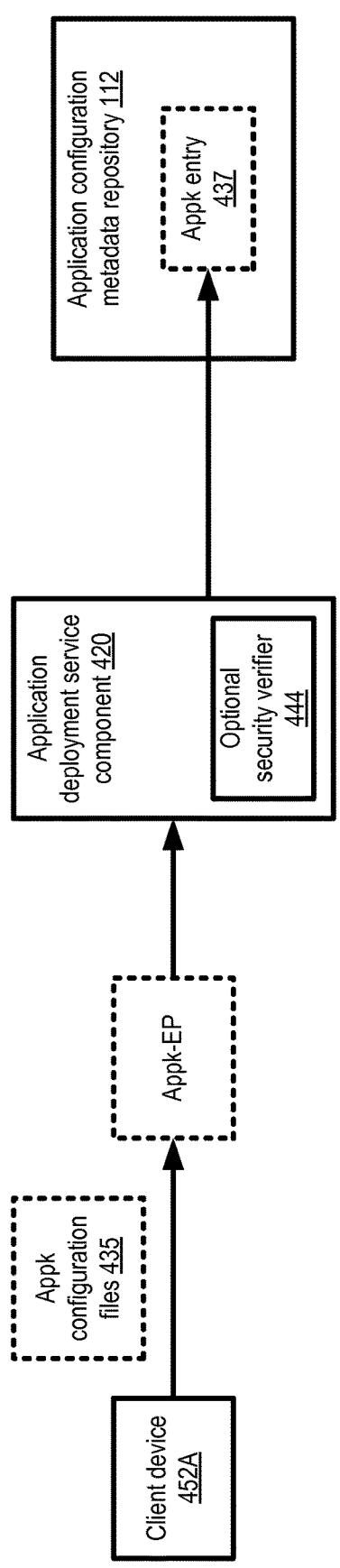
FIG. 4a-FIG. 4e collectively illustrate examples of requests that may be submitted via a custom communication channel endpoint of an application deployment service, according to at least some embodiments.

FIG. 4a-FIG. 4e collectively illustrate examples of requests that may be submitted via a custom communication channel endpoint of an application deployment service (ADS), according to at least some embodiments. According to some embodiments, before a particular managed application is deployed using the ADS, a set of configuration and environment information may have to be provided to the ADS. As shown in FIG. 4a, in some embodiments a custom channel created for the application may be used to submit the configuration information required as a prerequisite to a first deployment of an application Appk. The Appk configuration files 435 may be transmitted from a client device 452A to an endpoint Appk-EP of the custom channel. An ADS component 420 (which may include an optional security verifier component 444) may receive the configuration files 435, perform any security checks required, and store the configuration files 435 as the entry 437 for Appk in application configuration metadata repository 112 in the depicted embodiment if the security checks succeed. The entry 437 may be used if and when an Appk is actually deployed in the depicted embodiment; that is, resources for Appk need not be allocated just because configuration files 435 were submitted. (In the embodiments shown in FIG. 4a, the custom channel may have been set up in response to a separate request received via a programmatic interface which does not require the use of Appk-EP.)

Figure 4B:
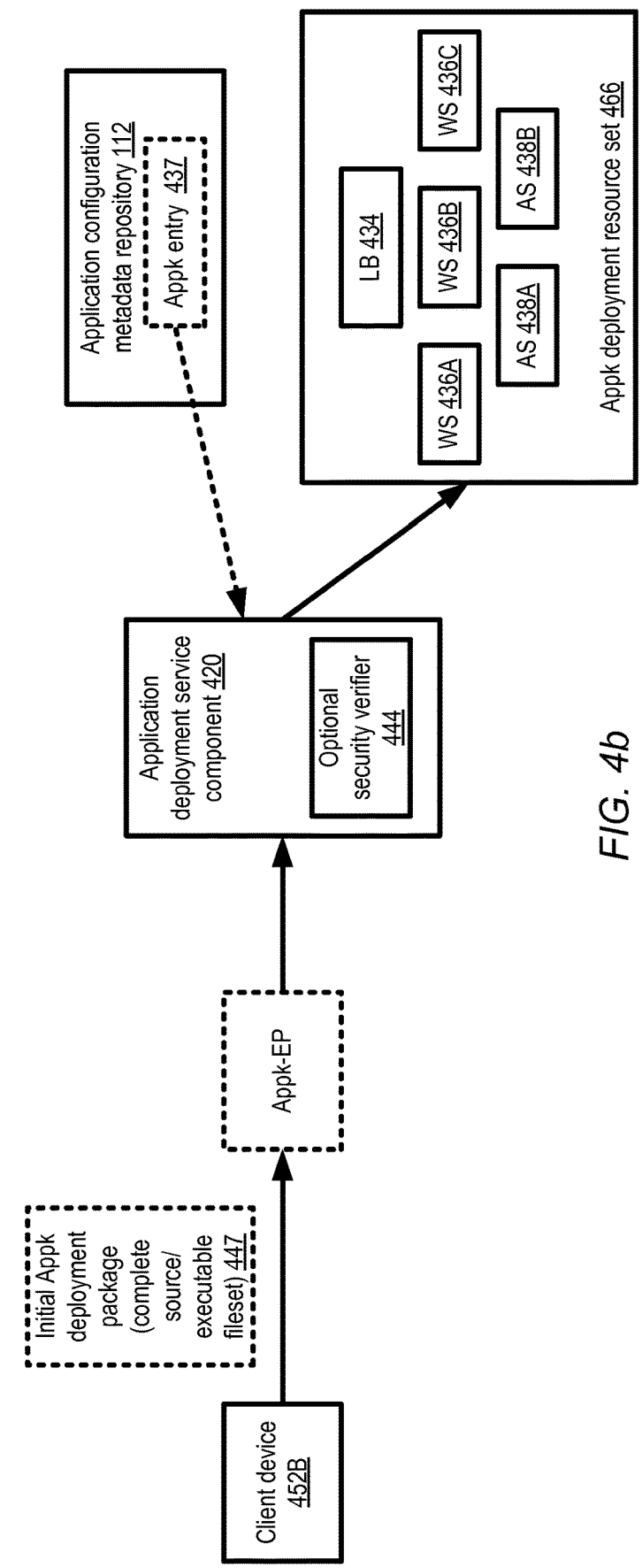

In FIG. 4b, an initial Appk deployment package 447 may be submitted to Appk-EP from a different client device 452B. Depending on the programming language and execution environment of Appk, the deployment package 447 may include only a single executable file, a collection of executable files, or some combination of source files and executable files. The source files may have to be compiled in some cases, while in other cases the files may be interpreted rather than compiled. In response to receiving the deployment package 447, in the example scenario of FIG. 4b the ADS component 420 may retrieve the Appk configuration entry 437 from the repository 112, and acquire a set of resources at which Appk's subcomponents are to be deployed. The initial deployment resource set 466 for Appk may, for example, include one or more load balancers such as LB 434, a plurality of web servers such as WS 436A, WS 436B and WS 436C, and a plurality of application servers such as AS 438A and AS 438B. In some embodiments, some or all of these resources may comprise virtual machines of a computing service of the provider network. Other provider network services may also or instead be used for the deployment and configuration of managed applications by the ADS in various embodiments, as discussed in greater detail below with respect to FIG. 5. In some embodiments, an initial deployment package 447 may be submitted together with configuration files 435, e.g., within a single message submitted to a custom channel endpoint Appk-EP; that is, the types of artifacts shown in FIGS. 4a and 4b need not necessarily be transmitted separately to the ADS component 420.

Figure 4C:
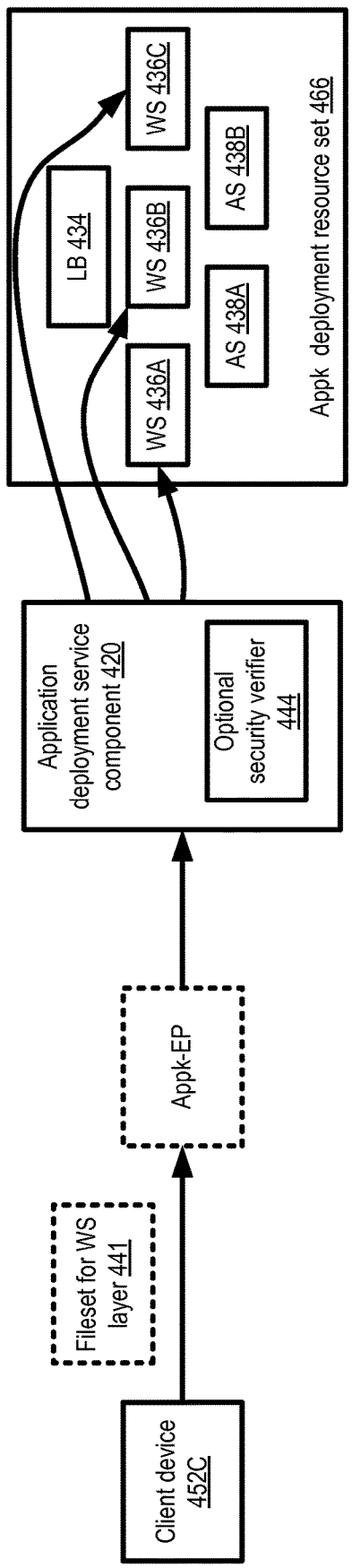

FIG. 4c illustrates the submission of a file set 441 for the web server layer (e.g., comprising one or more HTML or Javascript files) from a client device 452C to the ADS via Appk-EP. In this scenario, the ADS component 420 may parse the contents of the message containing file set 441, and determine that the file set is to be copied to one or more of the web servers of the Appk deployment resource set 466 (after any additional security or correctness checks required are performed). Accordingly, copies of the file set 441 may be transmitted to WS 436A, 436B and 436C. Other resources of the Appk resource set 466 may not be affected in the depicted embodiment by the submission of file set 441.

Figure 4D:
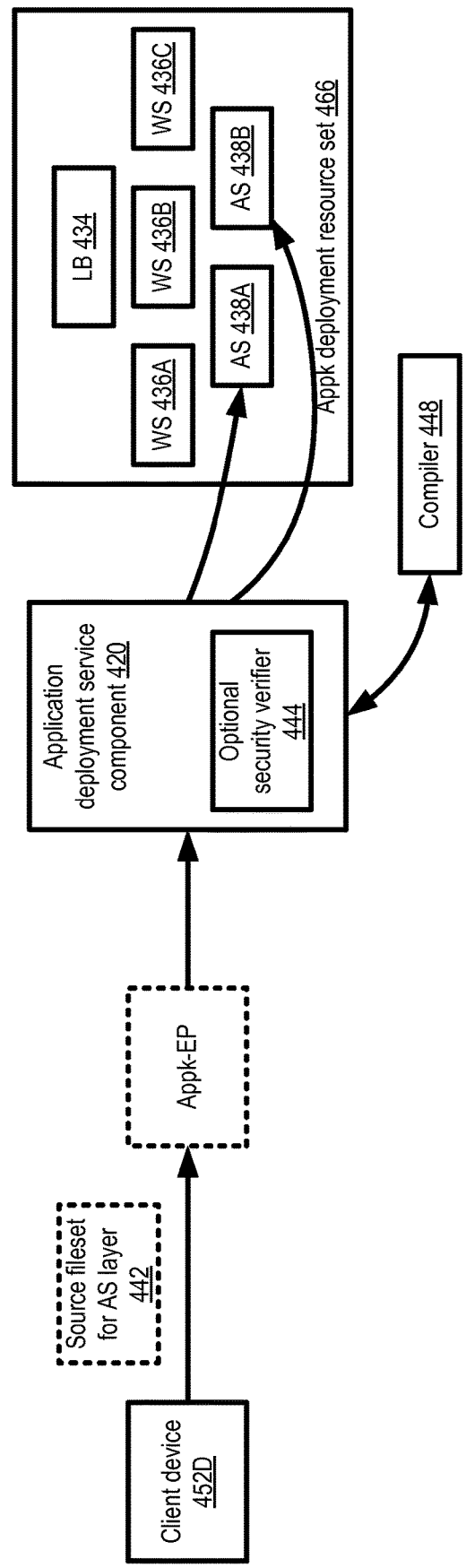

In FIG. 4d, a client may submit a set of source files 442 from client device 452D to Appk-EP, intended for the application server layer of Appk. The ADS component 420 may examine the contents of the message received from client device 452D, determine that the message contains source files which have to be compiled, and utilize a compiler 448 to obtain executable versions of the files. The executable versions may then be deployed to the application servers AS 438A and 438B. In at least some embodiments, the ADS component may first have to determine (e.g., by examining the name of a source file, or by parsing contents of the source file) a location within a source code hierarchy at which the file is to be placed in order to compile an application without errors. In some such scenarios, the ADS component may identify the correct location, save an older version of the file (if such an older version existed), store the newly submitted file in the location, and then invoke a compiler or similar tool to obtain the new version of the application executable. The new version of the executable application may then be run at one or more execution platforms. In other scenarios, the ADS may simply place the newly-submitted file in the location determined for it within the source code hierarchy, and explicit compilation may not be required (e.g., if the source file is a script to be interpreted rather than compiled).

Figure 4E:
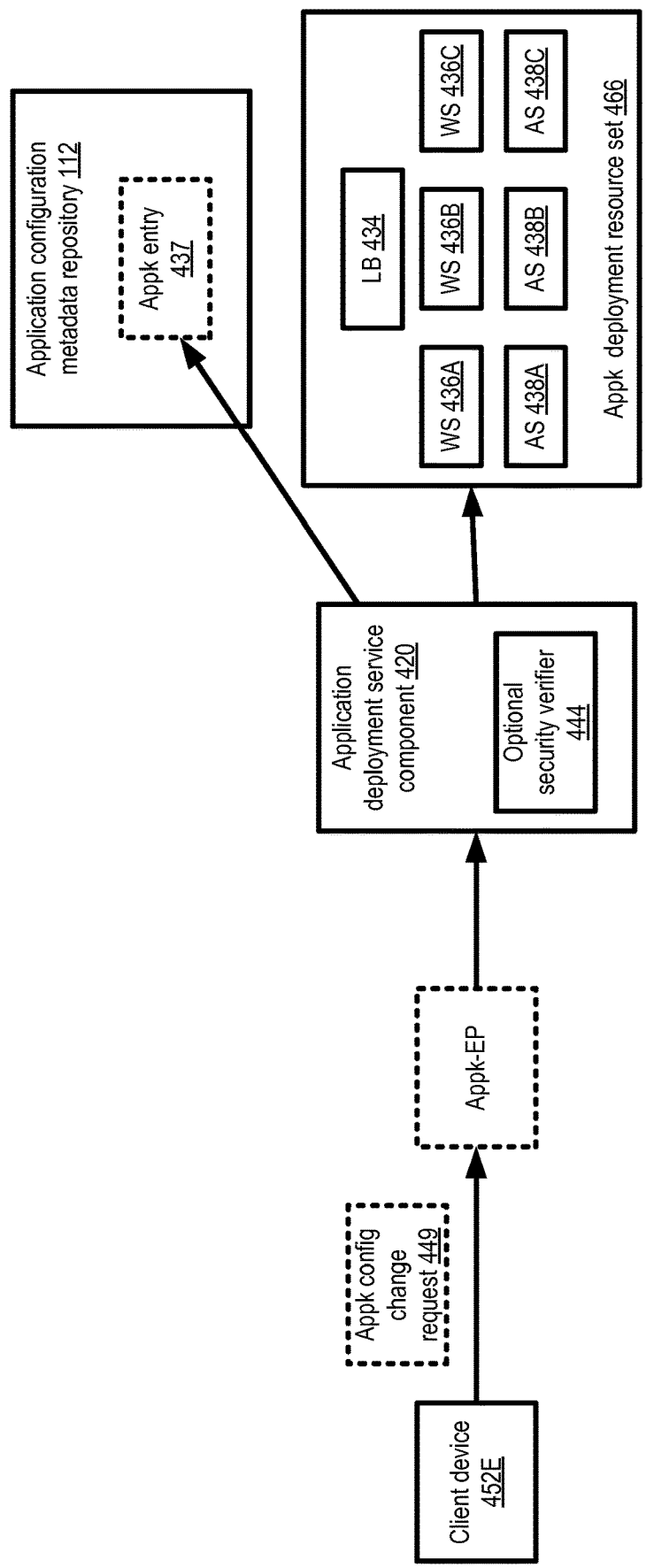

In FIG. 4e, a configuration change request 449 for Appk may be submitted from client device 452E via Appk-EP to the ADS component 420. The ADS component 420 may perform any additional security verification procedures needed for such changes, and modify the entry 437 stored in the application configuration metadata repository 112. Depending on the nature of the configuration change request, some of the resources allocated for Appk's deployment may also be modified. For example, as shown, an additional application server resource (AS 438C) may be employed to fulfill the configuration change request. The ADS component 420 may initiate the necessary actions (e.g., the acquisition of a computing platform for AS 438C, the copying of the necessary files to AS 438C, the configuration changes needed at the web server layer, and so on) for the configuration change without requiring any additional interactions with the client. A number of different categories of configuration-related deployment service tasks may be performed in response to messages received using the custom channels in various embodiments. Some configuration tasks may involve changes to the resources deployed for an application, while others may not require changes to the application's resource footprint. For example, a setting for a parameter such as a maximum number of threads in a thread pool of the application may be submitted in a message via the custom channel, or a request to deploy a new software module or extension may be submitted. In such scenarios, the tasks performed in response to the message may not result in a change to the set of resources used for the application. As shown in FIG. 4a-4e, a variety of different types of deployment-related artifacts may be submitted using a custom channel set up at an ADS for one or more managed applications, and the ADS may take different sets of actions based on the type of artifact submitted. In various embodiments, other types of deployment tasks (such as changes to the manner in which the health status of various resources is monitored) may also be requested using custom channels. Although the requests submitted to the ADS are shown as originating at different client devices 452A-452E in FIG. 4a-4e, and are handled by the same ADS component 420, in general the requests involving the use of a custom communication channel may originate at any appropriate client device and may be handled by any of a number of ADS components in various embodiments.

Application Deployment Using Other Provider Network Services

Figure 5:
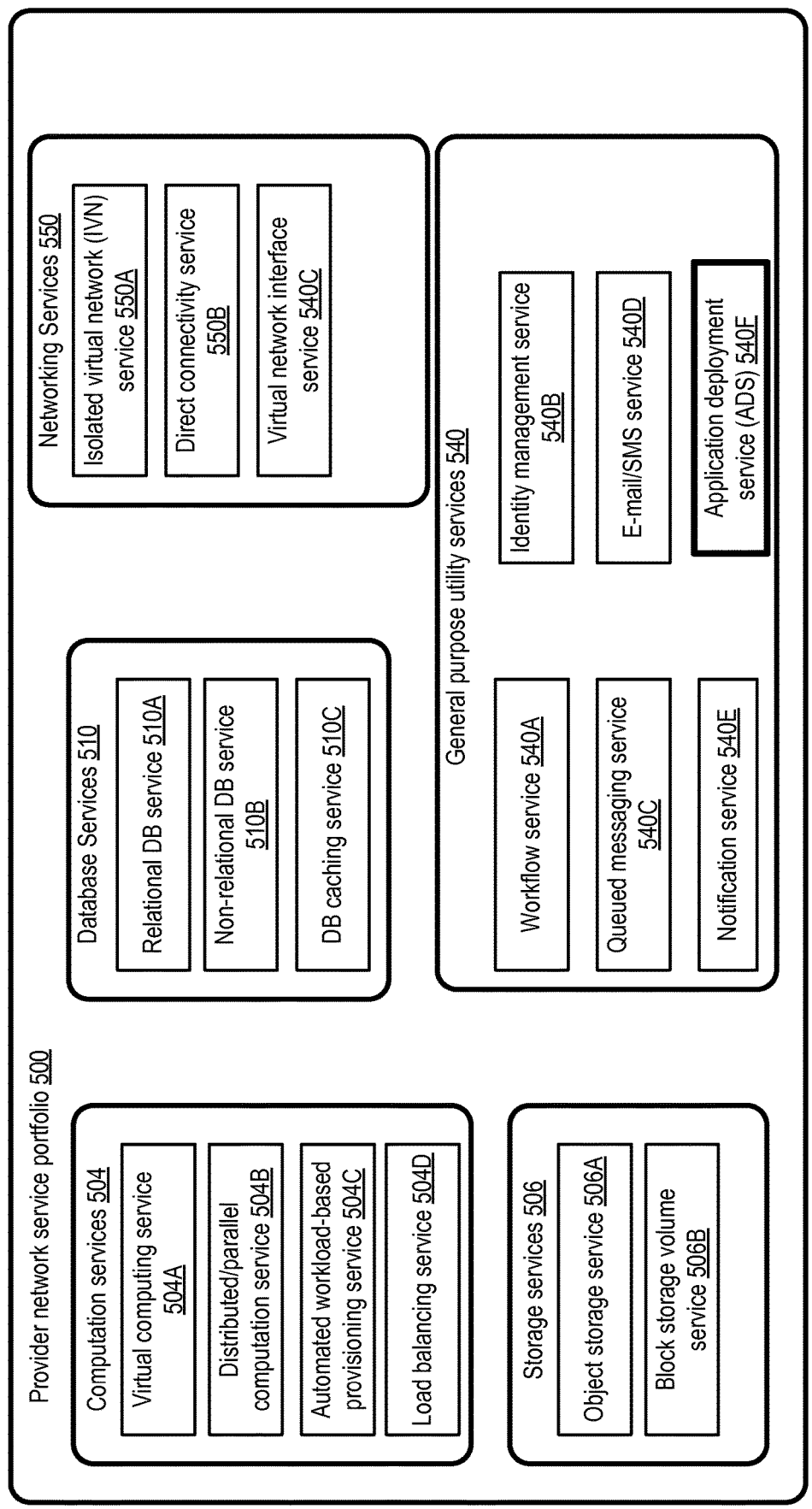
FIG. 5 illustrates examples of provider network services which may be used to implement application deployment workflows, according to at least some embodiments.

In some embodiments, as mentioned earlier, the deployment tasks performed at an ADS in response to a request received via an endpoint of a custom communication channel may involve the use of one or more other services of the provider network. FIG. 5 illustrates examples of provider network services which may be used to implement application deployment workflows, according to at least some embodiments. In the depicted embodiment, the provider network's service portfolio 500 may include a group of computation services 504, storage services 506, database services 510, networking services 550 and general-purpose utility services 540. (The application deployment service 540F is included in the general-purpose utility service group.) Computation services 504 may include, for example, a virtual computing service 504A (e.g., a service from which access to various types of general-purpose virtual machines can be obtained for deploying various applications managed by the ADS 540F), a distributed/parallel computing service 504B (with specialized hardware/software components designed for applications with high degrees of parallelism), an automated workload-based provisioning service 504C that can be used to gracefully scale up or scale down the resources allocated for deployed applications, and a load balancing service 504D to distribute workloads among groups of computational resources used for various deployed applications. For example, in FIG. 4*b*-FIG. 4*e*, the load balancer LB 434 may be implemented using the load balancing service 504D, and the WS and AS resources may be implemented using the virtual computing service 504A.

Several different types of storage-related services may be implemented at some provider networks, such as an object storage service 506A which provides web-services based access to unstructured storage objects, or a volume service 506B which provides block device level access to storage volumes. In some embodiments, a number of different database-related services may be implemented, such as relational database service 510A, non-relational (e.g., "noSQL") database service 510B, or database caching service 510C.

Various networking-related services may be supported at the provider network in the depicted embodiment, such as an isolated virtual network (IVN) service 550A. Using the combination of IVN service and virtual computing service 404A, numerous virtual machines and/or other devices may be configured as part of an isolated virtual network up for a customer, and the customer may be granted substantial networking configuration flexibility for the IVN. For example, customers may assign IP addresses of their choice within the isolated virtual network, set up subnets and routes, and so on, in a manner very similar to the way that network configuration settings could be selected at a customer-owned facility. An IVN may also be referred to as a "virtual private cloud" in some embodiments. A direct connectivity service 550B (which allows customers to connect external networks to the provider network via dedicated physical links or "direct connect" links), or a virtual network interface service 550C (which allows logical network interfaces to be programmatically attached to virtual machines, without requiring reconfiguration of physical network interface cards).

In addition to the ADS, the general purpose utility service category may include, for example, a workflow service 540A which can be used to implement workflows involving interactions between components of other services, an identity management service 540B for user/group authentication, a queued message service 540C for persistent messaging applications, an e-mail/SMS management service 540D, and a notification service 540E for scheduling various types of event notifications. A health monitoring service for deployed applications may also be implemented in some embodiments, and requests to change the configuration of agents of such a service monitoring one or more applications managed by the ADS may also be submitted via custom channels in various embodiments. Other services may be implemented at a provider network in different embodiments, and some of the types of services illustrated in FIG. 5 may not be implemented.

Various combinations of the services shown in FIG. 5 may be used for deployment-related tasks of the ADS in different embodiments. In embodiments in which the custom communication channels use e-mail or SMS, service 540D may be used to establish and administer the channels. In some embodiments, the database or storage services may be employed for managed applications for which the locally-available storage at the virtual machines of the virtual computing service 504A are insufficient. In one embodiment, the applications may be deployed within IVNs established using service 550A. In other embodiments, the developers or clients of the ADS may utilize the IVNs—that is, deployment artifacts may be submitted from devices within IVNs to the ADS. In at least one embodiment, a custom communication channel may have a security requirement that only submissions originating from within a specified IVN are to be accepted. The notification and messaging services may be used for inter-application communications in various embodiments and/or to notify customers when a particular deployment task is completed by the ADS. Each of the services shown in FIG. 5 may be implemented using some set of hardware and/or software resources, with some of the resources being shared by multiple services.

Methods for Using Custom Communication Channels for Application Deployment

Figure 6:
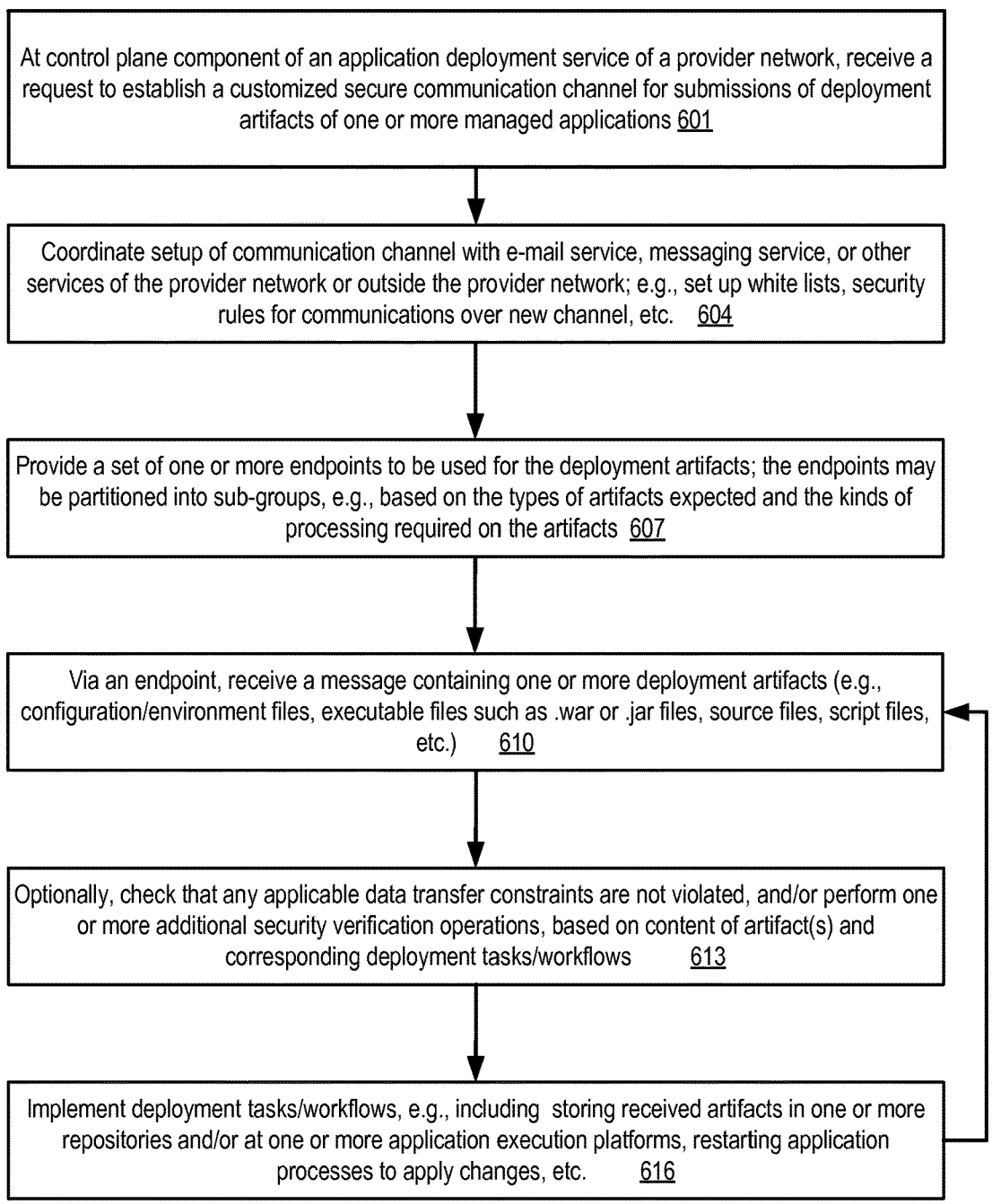
FIG. 6 is a flow diagram illustrating aspects of operations that may be performed to configure and use custom communication channels for transmitting deployment-related artifacts, according to at least some embodiments.

FIG. 6 is a flow diagram illustrating aspects of operations that may be performed to configure and use custom secure communication channels for transmitting deployment-related artifacts, according to at least some embodiments. As shown in element 601, a request to set up a secure customized communication channel to be used for transmitting deployment-related artifacts of one or more managed applications may be received at a control-plane component of a deployment service of a provider network. The setup request may indicate various properties of the channel, such as the type of communication mechanism to be used, the number of endpoints to be set up, the extra security verification steps to be performed (if any) in response to messages received via the endpoints, and so on.

The ADS control-plane component may perform one or more authentication and/or authorization checks with respect to the received setup request in the depicted embodiment, and may also verify that sufficient resources are available for the request to be accepted. If the request is accepted for implementation, the ADS component may coordinate the establishment of the requested channel with one or more other services or providers within and/or external to the provider network (element 604), such as an e-mail service or an SMS/texting service. Metadata records with content similar to that shown in FIG. 3 may be created and stored by or on behalf of the ADS in various embodiments. For example, entries representing white lists of approved submitters, the security rules for various endpoints, roles of submitters and receivers, etc., may be stored in a metadata repository of the ADS and/or the other entities involved in setting up or managing the channel.

A set of one or more endpoints (e.g., e-mail addresses, IP address and port combinations to be used for file transfers, SMS/texting destinations or the like) may be provided to the requester of the channel (element 607). In some embodiments, the set of endpoints may be partitioned: e.g., one group of endpoints may be designated for one group of white-listed submitters, and a different group of endpoints may be designated for another group of white-listed submitters. The endpoints may also or instead be partitioned based on their intended use or function in some embodiments, e.g., based on the categories of deployment tasks that may have to be performed in response the messages received via the endpoints. For example, some endpoints may be designated solely for source code submissions, while others may be designated for configuration-related artifact submissions. For source code submissions (depending on the programming language and/or run-time environment of the application), in some embodiments, the deployment tasks may include copying/storing a version of the submitted files in a repository, compiling the files, and/or copying the executable versions of the submitted files to a set of execution platforms. For configuration-related submissions, the deployment tasks may include updating a configuration file or application metadata record, re-starting one or more processes, allocating or de-commissioning resources, and so on.

After the setup phase of the custom communication channel is completed, clients may being submitting deployment-related artifacts via the endpoints of the channel. A particular message containing one or more artifacts may be received at an endpoint (element 610). The kinds of artifacts may differ based on the language and run-time features of the managed applications. For example, for some applications, executable files representing the application as a whole (e.g., in the form of a .jar file or a .war file), one or more executable modules that form part of the application, one or more source code files which may have to be compiled before deployment, one or more source files which do not require compilation, configuration files governing tunable parameters of the application, and/or configuration files which control the allocation of resources for the application, may all be considered legitimate kinds of artifacts. For other applications, only a subset of these types of deployment-related artifacts may be transmittable via the custom channel—e.g., while application developers may be permitted to submit some types of source code changes via the channel, large-scale configuration changes may not be permitted.

The ADS component which receives the message may parse its contents, extract and analyze the deployment-related artifacts, and determine what deployment tasks are to be performed based on the kinds of artifacts in the message. In some embodiments, the message may include explicit directives to the ADS indicating the deployment workflow or tasks to be performed using the submitted artifacts. The ADS component may optionally ensure that the artifacts (or the tasks corresponding to the message) do not violate any data transfer constraints which may be associated with the channel or the endpoint (element 613). In the depicted embodiment, the ADS component may also optionally determine, based on the message contents, whether any additional security verification operations (such as multi-party or multi-step authentication) are to be performed before the deployment tasks are initiated (as also indicated in element 613). In a multi-step authentication technique, the ADS may not implement any changes to the application deployment based on the message contents until one or more additional verification messages are received (e.g., from the submitter in response to a challenge from the ADS). In a multi-step multi-party authentication protocol, a confirmation that the sender of the message is to be trusted (at least with respect to the artifact or artifacts indicated in the received message) may have to be obtained at the ADS from some other trusted party, e.g., in response to a verification query sent by the ADS. In some embodiments, the security operations performed may differ based on the contents or type of the artifact—e.g., some artifacts indicative of significant configuration changes may require much stricter security checks than other artifacts which may simply add comments to a file or make minor corrections to a file. If the ADS component determines that a submitted message meets specified criteria, the deployment tasks associated with the submitted message may be initiated without additional security checks in various embodiments. In some embodiments, the security checks to be performed may be determined based at least in part on the submitter's identity—e.g., a particular developer's changes to source code may be accepted without additional security verification.

After any required additional security steps are completed (or if no such operations are required), the requested workflows may be initiated (element 616). As mentioned above, the deployment tasks performed as part of the workflow may include, for example, saving a version of an artifact at a repository, determining the appropriate location within a code hierarchy for one or more files and storing the files in the determined locations, compiling one or more files, re-starting one or more processes, allocating and configuring additional resources for a deployed application, de-commissioning one or more previously-allocated resources for a deployed application, and so on. The operations corresponding to elements 610, 613 and 616 may be repeated for each message received via the endpoints of the custom channel.

It is noted that in various embodiments, some of the kinds of operations shown in FIG. 6 may be implemented in a different order than that shown, or may be performed in parallel (e.g., continuously) rather than sequentially. For example, processing for several different messages submitted via the custom channel's endpoints may be performed in parallel. In some embodiments, some of the operations shown in FIG. 6 may not be implemented, or additional operations not shown may be performed Use Cases The techniques described above, of establishing customized communication channels for submitting artifacts to an application deployment service, may be useful in a variety of scenarios. Large software development and quality assurance teams may often include employees distributed around the world, using many different types of computing devices to write and initiate testing of complex software programs. Such teams may often utilize the functionality of application deployment services of a provider network to take advantage of the scalable infrastructure and to delegate responsibility for resource allocations and resource health management. If the deployment service supports the establishment of a variety of customizable channels for submissions of source code and/or configuration changes, instead of requiring all submissions to follow a rigid submission protocol involving the use of a default channel such as an administration console, this may increase the productivity of the development and quality assurance teams.

Illustrative Computer System

Figure 7:
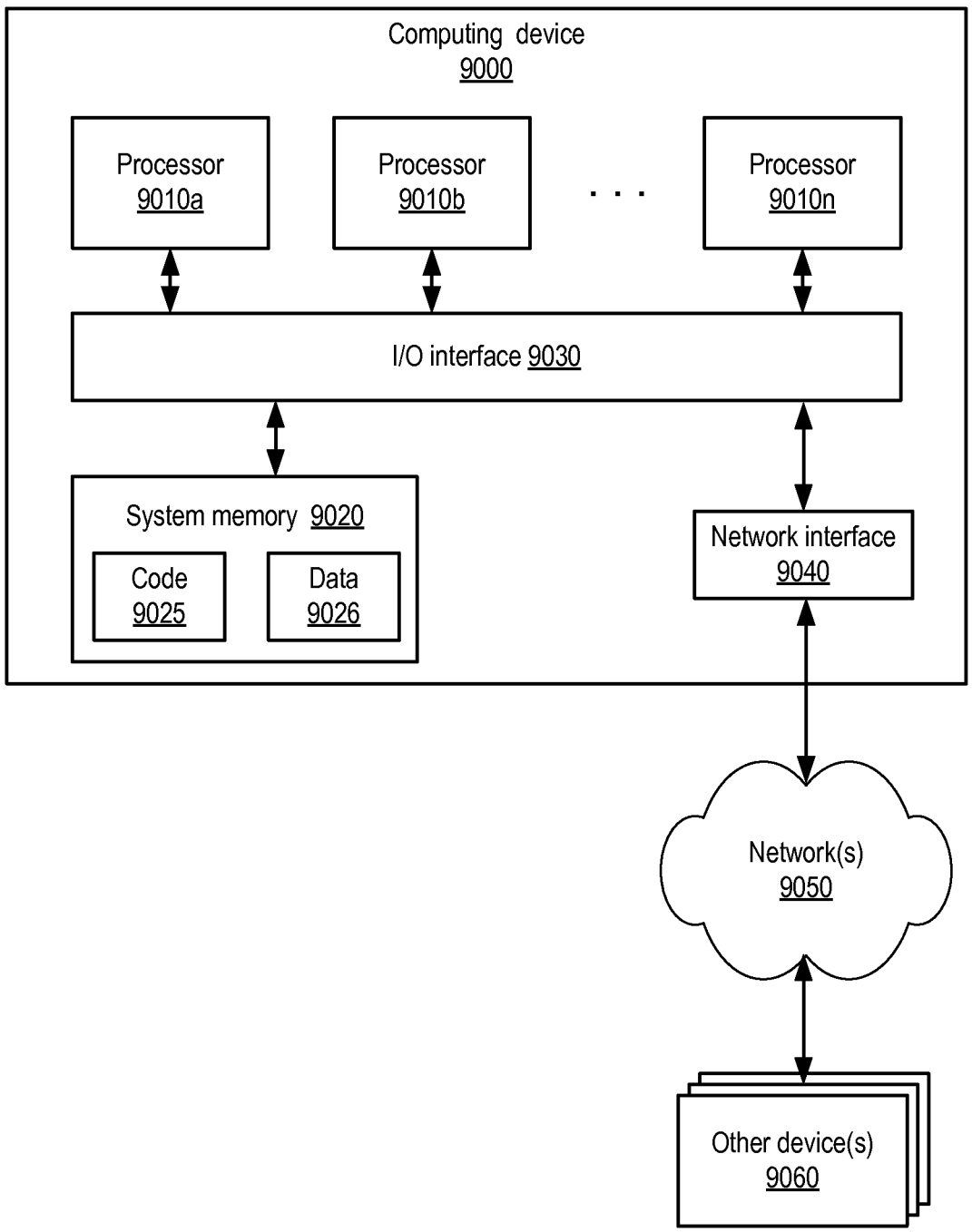
FIG. 7 is a block diagram illustrating an example computing device that may be used in at least some embodiments.

In at least some embodiments, a server that implements one or more of the techniques described above for supporting the establishment and use of custom communication channels for artifact submission to a deployment service (including various control-plane and/or data-plane components of the deployment service and/or the resource used for deploying and executing managed applications) may include a general-purpose computer system that includes or is configured to access one or more computer-accessible media. FIG. 7 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a Low Pin Count (LPC) bus, a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 6, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 6 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, which may be implemented via network interface 9040. Portions or all of multiple computing devices such as that illustrated in FIG. 7 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   one or more computing devices of a provider network that implement one or more components of an application deployment service configured to provide one or more endpoints for a default channel to receive respective application deployment artifacts for a plurality of clients of the application deployment service, the respective application deployment artifacts to be executed at one or more execution platforms of the provider network, wherein the one or more endpoints for the default channel include one or more communication addresses for the default channel;

wherein the application deployment service is further configured to implement an interface for clients to request establishment of endpoints for communication channels distinct from the default channel, wherein the one or more components are configured to:

receive a first request via the interface for a communication channel that is distinct from the default channel, to be used by one or more clients to transmit one or more deployment artifacts of a particular application to be executed at one or more of the execution platforms of the provider network;

responsive to the first request, establish a particular endpoint of the communication channel that is distinct from the default channel, and transmit, to at least one destination associated with the one or more clients, the particular endpoint of the communication channel, wherein the destination associated with the one or more clients differs from the one or more execution platforms, and wherein the particular endpoint is to be used for transmitting deployment artifacts associated with at least a first deployment task category of a plurality of deployment task categories associated with the particular application;

after transmission to the at least one destination of the indication of the particular endpoint of the communication channel, receive a message directed to the particular endpoint by a particular client of the one or more clients, and extract a payload from the received message;

determine, based at least in part on an examination of the payload, that one or more security verification operations are to be performed prior to an implementation of a deployment task of the first deployment task category; and in response to determining that the one or more security verification operations succeeded, implement the deployment task, wherein the deployment task comprises storing a version of a deployment artifact indicated in the payload within a repository.

2. The system as recited in claim 1, wherein the one or more components are configured to:

store a representation of a first set of one or more submitters authorized to submit messages to the particular endpoint, and a representation of a second set of one or more submitters authorized to submit messages to a different endpoint established for the communication channel.

3. The system as recited in claim 1, wherein the one or more components are configured to:

initiate an establishment of a second endpoint of the communication channel, wherein the second endpoint is to be used for transmitting deployment artifacts associated with at least a second deployment task category of the plurality of deployment task categories.

4. The system as recited in claim 1, wherein the one or more security verification operations include a use of one or more of: (a) a multi-step authentication protocol or (b) a multi-party authentication protocol.

5. The system as recited in claim 1, wherein the plurality of deployment task categories include one or more of: (a) updating source code, (b) deploying an executable package, (c) modifying an application configuration setting, or (d) modifying a resource set used for executing an application.

6. A method, comprising:

performing, at an application deployment service implemented at one or more computing devices of a provider network:

providing one or more endpoints for a default channel to receive respective application deployment artifacts for a plurality of clients of the application deployment service, the respective application deployment artifacts to be executed at one or more execution platforms of the provider network, wherein the one or more endpoints for the default channel include one or more communication addresses for the default channel;

implementing an interface for clients to request establishment of endpoints for communication channels distinct from the default channel;

receiving a first request, via the interface, for a communication channel that is distinct from the default channel, to be used by one or more clients to transmit one or more deployment artifacts of a particular application to be executed at one or more of the execution platforms of the provider network;

responsive to the first request, establishing a particular endpoint of the communication channel that is distinct from the default channel, and transmitting to at least one destination associated with the one or more clients, the particular endpoint of the communication channel, wherein the destination associated with the one or more clients differs from one or more execution platforms configured to implement a first deployment task corresponding to the particular application;

after transmitting the particular endpoint to the at least one destination associated with the one or more clients, receiving a first message directed to the particular endpoint by a particular client of the one or more clients;

determining, in response to the first message received via the particular endpoint, that one or more security verification operations are to be performed prior to an implementation of the first deployment task corresponding to the first message and the particular application; and in response to completing the one or more security verification operations, implementing the first deployment task using at least a first artifact indicated in the first message.

7. The method as recited in claim 6, wherein the particular endpoint comprises one of: (a) an e-mail address, (b) a short message service (SMS) destination address, or (c) a file transfer destination address.

8. The method as recited in claim 6, further comprising performing, by the application deployment service:

storing a representation of a first set of one or more submitters authorized to submit messages to the particular endpoint, and a representation of a second set of one or more submitters authorized to submit messages to a different endpoint established for the communication channel.

9. The method as recited in claim 6, wherein the first deployment task belongs to a first deployment task category of a plurality of deployment task categories of the particular application, further comprising performing, by the application deployment service:
   initiating an establishment of a second endpoint of the communication channel, wherein the second endpoint is to be used for transmitting deployment artifacts associated with at least a second deployment task category of the plurality of deployment task categories.

10. The method as recited in claim 9, wherein the plurality of deployment task categories include one or more of: (a) updating source code, (b) deploying an executable package, (c) modifying an application configuration setting, or (d) modifying a resource set used for executing an application.

11. The method as recited in claim 6, wherein the one or more security verification operations include a use of one or more of: (a) a multi-step authentication protocol or (b) a multi-party authentication protocol.

12. The method as recited in claim 6, wherein said implementing the first deployment task comprises:
   determining a particular location within a source code hierarchy at which a particular source code file included in the first message is to be stored;
   storing the particular source code file at the particular location;
   generating, using the particular source code file, an executable version of the particular application; and
   instantiating an execution of the particular application at one or more execution platforms using the executable version.

13. The method as recited in claim 6, further comprising performing, by the application deployment service:
   in response to receiving a second message at the particular endpoint, determining that no additional security verification operations are to be scheduled before implementing a second deployment task indicated in the second message.

14. The method as recited in claim 6, further comprising performing, by the application deployment service:
   receiving, via a programmatic interface, an indication that an authorized entity associated with the particular application has revoked rights of the one or more clients to submit deployment artifacts via the communication channel; and
   in response to receiving a second message subsequent to the indication at the particular endpoint, discarding the second message.

15. The method as recited in claim 6, further comprising performing, by the application deployment service:
   rejecting a second message directed to the particular endpoint based at least in part on determining that the second message violates one or more data transfer constraints associated with the particular endpoint.

16. A non-transitory computer-accessible storage medium storing program instructions that when executed on one or more processors implement one or more components of an application deployment service configured to:
   provide one or more endpoints for a default channel to receive respective application deployment artifacts for a plurality of clients of the application deployment service, the respective application deployment artifacts to be executed at one or more execution platforms of a provider network, wherein the one or more endpoints for the default channel include one or more communication addresses for the default channel; and
   implement an interface for clients to request establishment of endpoints for communication channels distinct from the default channel, wherein the one or more components are configured to:
      receive a first request via the interface for a communication channel that is distinct from the default channel, to be used by one or more clients to transmit one or more deployment artifacts of a particular application;
      responsive to the first request establish a particular endpoint of the communication channel that is distinct from the default channel, and transmit to at least one destination associated with the one or more clients, the particular endpoint of the communication channel, wherein the destination associated with the one or more clients differs from one or more execution platforms configured to implement a first deployment task corresponding to the particular application;
      after transmission of the particular endpoint to the at least one destination associated with the one or more clients, receive a first message directed to the particular endpoint by a particular client of the one or more clients;
      determine, in response to the first message received via the particular endpoint, that one or more security verification operations are to be performed prior to an implementation of the first deployment task corresponding to the first message and the particular application; and
      in response to completing the one or more security verification operations, implement the first deployment task using at least a first artifact indicated in the first message.

17. The non-transitory computer-accessible storage medium as recited in claim 16, wherein the particular endpoint comprises one of: (a) an e-mail address, (b) a short message service (SMS) destination address, or (c) a file transfer destination address.

18. The non-transitory computer-accessible storage medium as recited in claim 16, wherein the one or more components of the application deployment service are further configured to:
   store a representation of a first set of one or more submitters authorized to submit messages to the particular endpoint, and a representation of a second set of one or more submitters authorized to submit messages to a different endpoint established for the communication channel.

19. The non-transitory computer-accessible storage medium as recited in claim 16, wherein the first deployment task belongs to a first deployment task category of a plurality of deployment task categories of the particular application, wherein the one or more components of the application deployment service are further configured to:
   initiate an establishment of a second endpoint of the communication channel, wherein the second endpoint is to be used for transmitting deployment artifacts associated with at least a second deployment task category of the plurality of deployment task categories.

20. The non-transitory computer-accessible storage medium as recited in claim 19, wherein the plurality of deployment task categories include one or more of: (a) updating source code, (b) deploying an executable package, (c) modifying an application configuration setting, or (d) modifying a resource set used for executing an application.

* * * * *